United States Patent [19]
Mirtain et al.

[11] 3,786,851
[45] Jan. 22, 1974

[54] BELTED PNEUMATIC TIRES

[75] Inventors: Henri Mirtain; Jacques Vervin, both of Compiegne, France

[73] Assignee: Uniroyal S. A., Neuilly-Sur-Seine, France

[22] Filed: Mar. 2, 1971

[21] Appl. No.: 120,090

[30] Foreign Application Priority Data
Mar. 4, 1970  France .............................. 70.07797

[52] U.S. Cl. ....................................... 152/361 DM
[51] Int. Cl. .............................................. B60c 9/20
[58] Field of Search ..................................... 152/361

[56] References Cited
UNITED STATES PATENTS

| | | | |
|---|---|---|---|
| 3,126,042 | 3/1964 | Cegnar | 152/361 |
| 3,503,432 | 3/1970 | Maiocchi | 152/361 X |
| 3,083,749 | 4/1963 | Destinay et al. | 152/361 |
| 3,515,197 | 6/1970 | Boileau | 152/361 |
| 2,982,328 | 5/1961 | Emanueli et al. | 152/361 |
| 3,550,666 | 12/1970 | Menell | 152/361 X |

Primary Examiner—Robert G. Sheridan
Assistant Examiner—George H. Libman
Attorney, Agent, or Firm—Jay L. Chaskin

[57] ABSTRACT

Belted pneumatic tires characterized by improved tread-reinforcing breaker constructions are disclosed. In any such breaker, a plural-layer ply structure of non-metallic cord ply having the cords thereof oriented at a 0° angle to the median equatorial plane of the tire is superposed on a plural-layer ply structure of metallic wires or strips which in each layer are crossed relative to those in the adjacent layer and are oriented at a bias angle, preferably between 16° and 30°, to the plane. The layers of non-metallic cord ply structure are of equal width and are symmetrical with respect to the median equatorial plane. The plural-layer non-metallic cord ply structure is constituted by a single length of breaker cord wound in a continuous spiral circumferentially of the carcass for at least a plurality of full turns. The layers of the metallic ply structure may be of equal or unequal widths, and arranged symmetrically or asymmetrically with respect to median equatorial plane of the plural-layer nonmetallic ply structure. Where the layers of the metallic ply structure have unequal widths, the widest ply may be either radially outward or radially inward of the other ply or plies. The width of the non-metallic ply structure ranges from 30mm more to 30mm less than the width of the widest ply layer of the metallic ply structure. The widest ply layer of the metallic ply structure is symmetrical with respect to the median equatorial plane and the non-metallic ply structure.

The foregoing abstract is not to be taken either as a complete description or as a limitation of the present invention. In order to understand the full nature and extent of the technical disclosure of this application, reference must be had to the following detailed description and the accompanying drawings as well as to the claims.

26 Claims, 14 Drawing Figures

INVENTORS
HENRI MIRTAIN
JACQUES VERVIN
BY Jay L Chase
ATTORNEY

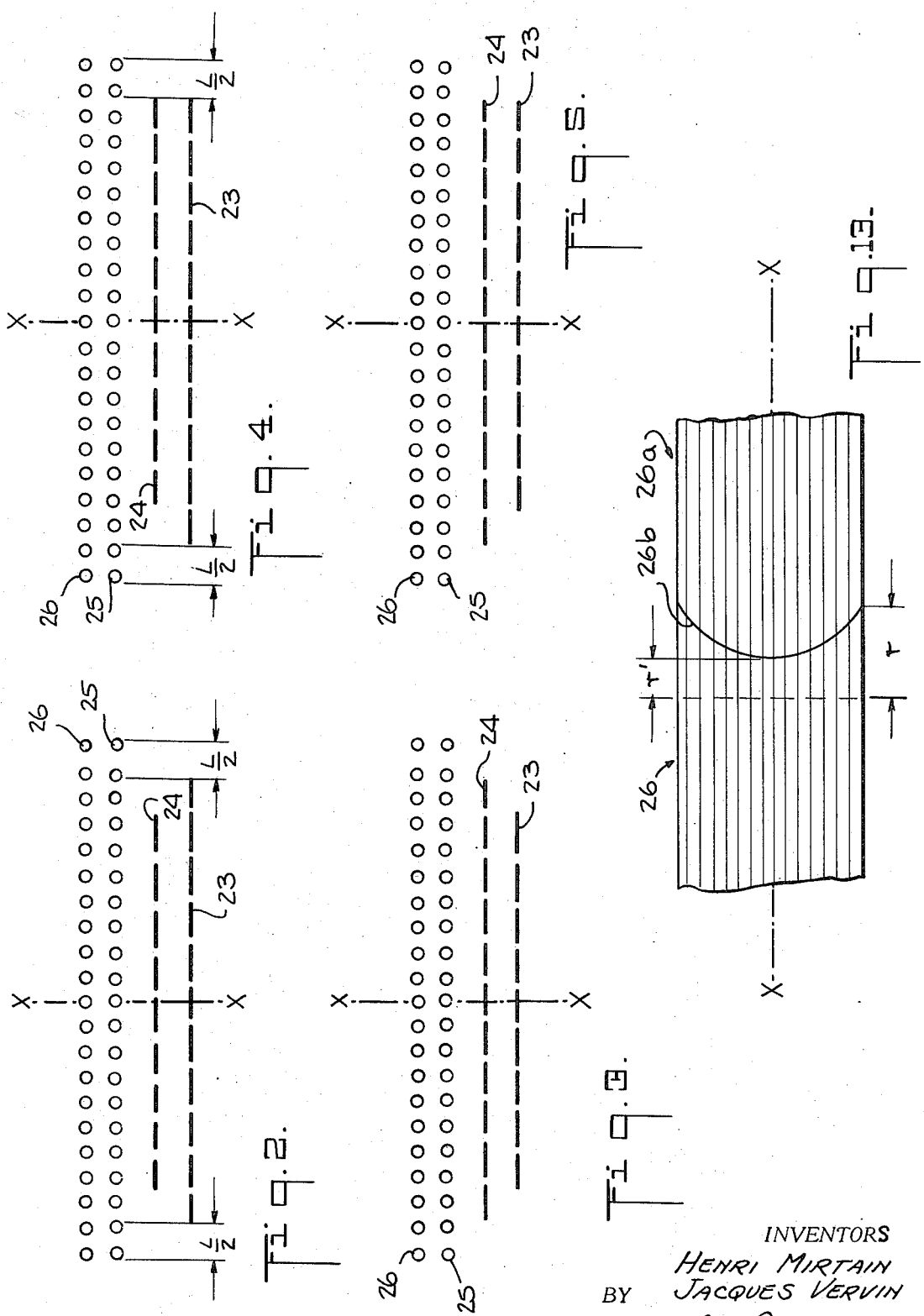

BELTED PNEUMATIC TIRES

This invention relates to an improved belt or breaker for pneumatic tires having a radial carcass or a substantially radial carcass.

It is known that the belts or breakers which are part of the construction of pneumatic tires are designed to counteract the forces of internal pressure to which they are subjected, as well as forces such as tensions or compressions of dynamic origin, and to counteract the deformations to which they are subjected in service, under the influence, for example, of accelerations or decelerations of the vehicle, centrifugal forces when turning, or high speeds in a straight line.

In the course of the displacement of the vehicle equipped with such tires, these forces vary substantially. The construction of the belt or breaker must therefore be such that it will withstand in an optimum manner, the effects of these various forces. The belt or breaker, especially for radial ply carcass tires, are composed of superposed mutually crossed rubberized plies of parallel essentially inextensible textile cords or steel cables or strips of steel or monofilaments.

In this type of belt or breaker constructed of different materials such as steel and textile, each assumes a different function. Thus the textile breaker plies insure a resistance to stretching and compression along the parallels to the equatorial plane of the tire carcass, while the metal plies insure resistance to stretching and compression along the directions perpendicular to the equatorial plane, that is to say along the meridians of the casing.

In view of the functions thus assigned to each of these layers of belt plies, it has been found that certain arrangements of these layers were preferable to others, in view of certain criteria such as comfort or weight, or with a view to reconciling certain qualities of tires which up to now seemed impossible to combine in one and the same tire.

It is an object of the present invention, therefore, to provide belted pneumatic tires having a novel and improved breaker construction.

A more particular object of the present invention is a novel and improved belted pneumatic tire with a breaker constructed to provide desirable qualities of road holding ability, driving comfort, lightness in weight, high speed capability and high wear resistance.

Generally speaking, the present invention is a belted tire in which the tread-reinforcing belt or breaker interposed between the carcass and the tread is characterized by the combination of a first plural-layer metallic ply structure of at least two metal plies and a second plural-layer ply structure of at least two non-metallic plies of equal width superposed on the first ply structure. The reinforcing elements of the first ply structure are parallel to each other and oriented at a bias angle to the equatorial plane of the tire carcass at an angle between 16° and 30°. The second ply structure is disposed symmetrically with respect to the median equatorial plane. The non-metallic reinforcing elements of the second ply structure are parallel to the median equatorial plane and are preferably made of a heat-shrinking material. The second ply structure is a single length of 0° breaker cord of appropriate width wound in a continuous spiral circumferentially of the tire carcass for a plurality of full turns and preferably for an additional small fraction of the next full turn. The width of the non-metallic ply structure is such that each remote lateral edge is within an interval 60mm wide, the center of which interval is determined by the corresponding remote lateral edge of the widest metal ply. The ply layers of the metal ply structure can be of equal or unequal widths and the structure can be arranged symmetrically or asymmetrically to the median equatorial plane and the non-metallic ply structure. Where the widths are unequal, either the radially inwardmost or the radially outwardmost ply can be the widest ply. Further where the widths are unequal, the remote lateral edges of two adjacent plies can correspond and the other remote lateral edges can be offset from each other. The widest ply of the metal ply structure is symmetrical with respect to the median equatorial plane and the non-metallic ply structure.

The foregoing and other objects, characteristics and advantages of the present invention will be more clearly understood from the following detailed description of several embodiments thereof when read in conjunction with the accompanying drawings, in which:

FIGS. 2 to 9 are diagrammatic illustrations, similar to FIG. 1, but without the tire environment, of various modifications and embodiments of the breaker construction of the present invention;

FIG. 13 is a partial plane view of FIG. 12 showing the zone of end overlap of the textile plies of the breaker.

Figure 1:
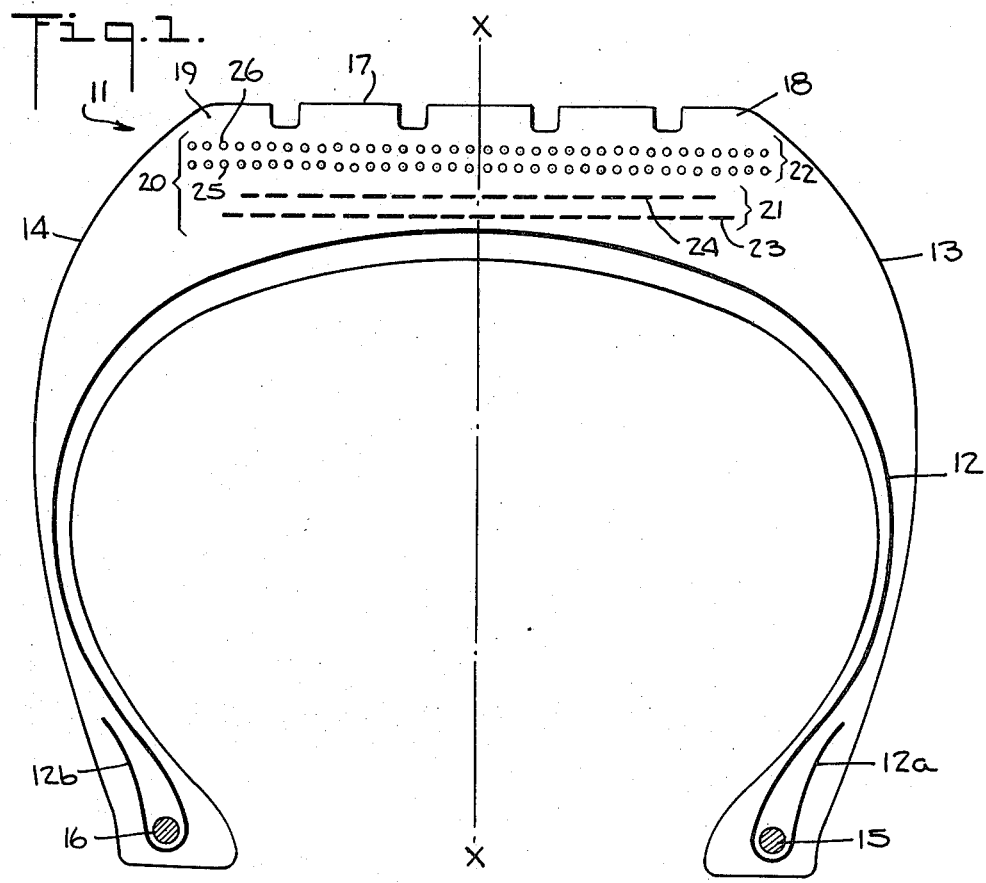
FIG. 1 is a diagrammatic transverse or radial section through a tire characterized by a breaker construction including plural-layer textile and metallic ply structures according to one embodiment of the present invention.
Figure 1A:
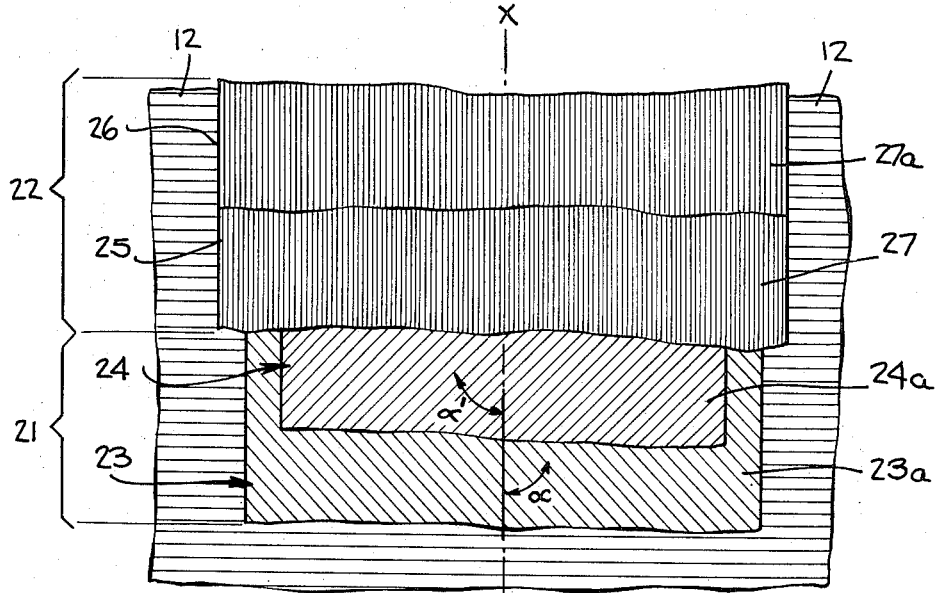
FIG. 1A is a diagrammatic plan view of the breaker construction of the tire shown in FIG. 1.
Figure 6:
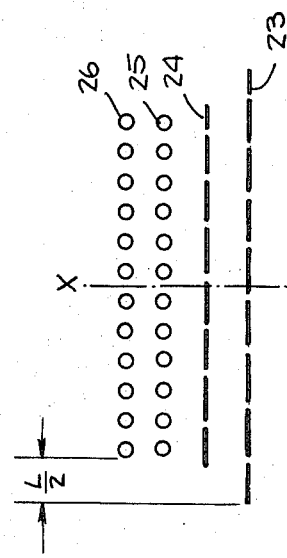
Figure 7:
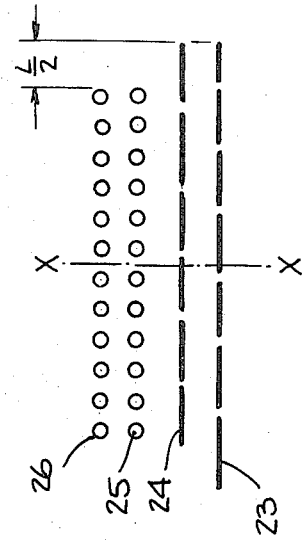

Referring to FIGS. 1 and 1A, the tire 11 according to the basic aspects of the present invention comprises, for example, a radial or substantially radial ply carcass 12, which may be either a single-ply or a plural-ply structure and the reinforcing element of which may be cords or cables of such materials as rayon, nylon, polyester, glass fiber, steel wire or the like. The tire 11 further includes sidewalls 13 and 14 overlying the respective lateral regions of the carcass and terminating at their radially inwardmost edges in a pair of beads 15 and 16. A tread 17 overlies the crown region of the carcass and adjoining the sidewalls 13 and 14 at their radially outwardmost regions, i.e. the shoulders 18 and 19 of the tire, and a breaker 20 interposed between the crown region of the carcass and the tread for reinforcing the latter. The marginal regions of the carcass ply or plies 12 are turned up about the beads 15 and 16, as shown at 12a and 12b.

It is to be understood that although the tire 11 has been referred to herein and is illustrated in FIGS. 1 and 1A as a radial ply tire or a substantially radial ply tire, the present invention, directed to the construction of the breaker, is applicable as well to belted tires having non-radial or bias ply carcass constructions in which the cords are oriented at bias angles below 80°. As is well known in the art, a tire having a carcass construction in which the cords of each body ply are radial or substantially radial in orientation, i.e. disposed in planes oriented substantially normal to the plane of the beads and to the crown centerline or median equatorial plane X—X of the tire, has a relatively high bias angle of about 80° to 90°.

Referring to FIGS. 1 and 1A, the breaker 20 according to the basic principles of the invention and according to one embodiment thereof comprises two distinct ply structures 21 and 22 arranged in superposed relation to each other circumferentially of the carcass 12 and generally symmetrical with respect to the median equatorial plane X—X of the tire 11. The first ply structure 21 is shown as a plural-layer arrangement of two plies or layers 23 and 24 of rubberized parallel metallic, preferably steel, reinforcing elements 23a and 24a which may be either lamelliform, i.e. in the form of flat strips or bands with rounded edges, or filiform, i.e., in the form of generally round wires or cables. The elements 23a and 24a are generally symmetrically oriented at respective equal but opposite substantial bias angles $\alpha$ and $\alpha'$ to the median equatorial plane X—X. The bias angle $\alpha$ and $\alpha'$ is approximately 16° to 30° to the median equatorial plane and the reinforcing elements from one ply to the next adjacent ply may or may not symmetrically intersect one another. The second ply structure 22 is shown as a plural-layer arrangement of two plies or layers 25 and 26 of rubberized parallel breaker cords or cables 27 and 27a of non-metallic textile material such as rayon, glass fiber, nylon, polyester and the like, oriented as an essentially 0° angle, i.e., parallel, to the equatorial plane X—X.

Figure 8:
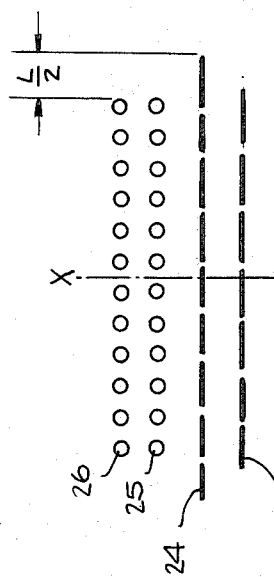
Figure 9:
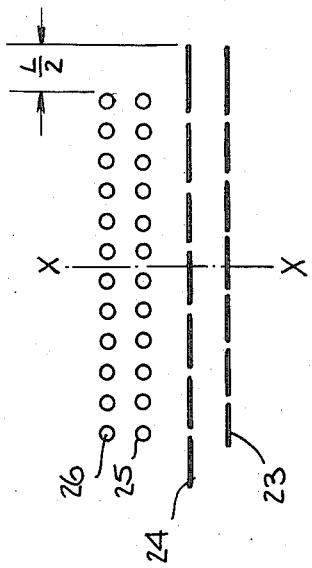
Figure 10:
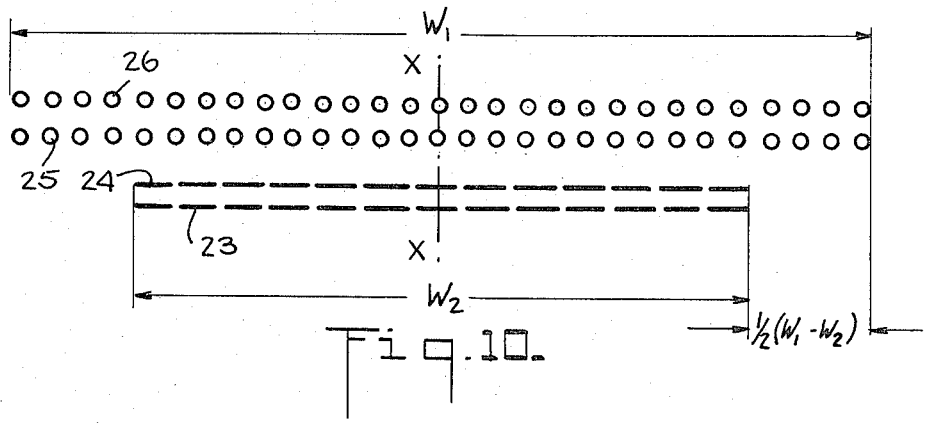
FIGS. 10 and 11 are diagrammatic illustrations, similar to FIG. 1, but without the tire environment, of two further modifications and embodiments of the textile ply-layers with respect to the metal ply-layers of the breaker, showing certain dimensional relationships.
Figure 11:
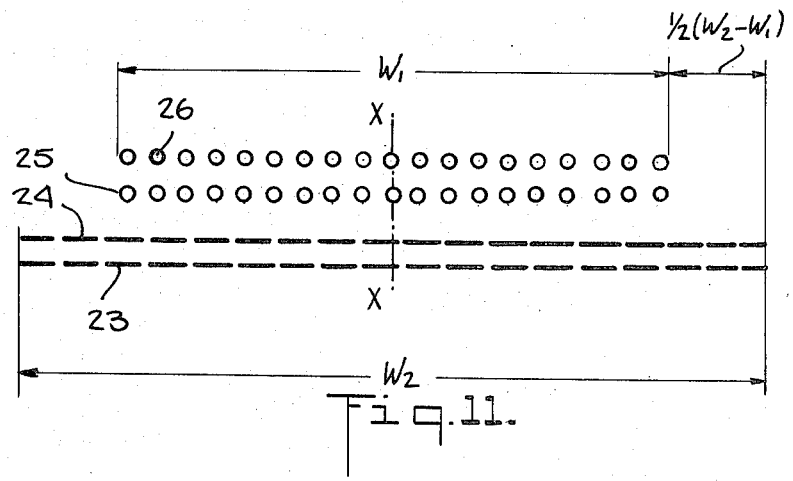

The plies 23 and 24 can be either of unequal widths, as shown in FIGS. 1 to 9 or of equal widths, as shown in FIGS. 10 and 11. Where the plies 23 and 24 are of unequal widths, the inner ply 23 can be greater in width than the outer ply 24, or the ply 23 can be lesser in width than the ply 24. The two ply structures 21 and 22 can be superposed symmetrically with respect to the median equatorial plane X—X of the carcass, as shown in FIGS. 1 and 1A, 2, 3, 6, 7, 10 and 11. The two ply structures 21 and 22 may also be superposed asymmetrically with respect to the median equatorial plane X-X, as shown in FIGS. 4, 5, 8 and 9. In FIGS. 4, 5, 8 and 9, the ply structure 21 is displaced laterally to one side of the median equatorial plane such that plies 23 and 24 are of equal width on that side, whereas on the other side, the plies 23 and 24 are of unequal widths. It is within the contemplation of the present invention that the asymmetric arrangement can be on either lateral side of the median equatorial plane. As shown in FIGS. 4 and 9 the inner ply 23 can have a greater width than the outer ply 24, or as shown in FIGS. 5 and 8, the inner ply 23 can have a lesser width than the outer ply 24. The terms "inner ply" and "outer ply" refer to a radial section of the tire when viewed from the carcass to the tread.

In the present invention, the widest ply layer of the metal ply structure is symmetrical with respect to the median equatorial plane and the non-metallic ply structure. As shown in the several Figures plies 25 and 26 forming ply structure 22 are of equal widths and are superposed symmetrically with respect to the median equatorial plane X—X. The total width $W_1$ of the ply structure 22 can be greater or less than the total width $W_2$ of the ply structure 21. In either instance, the total width $W_1$ is between a minimum width $W_m$ and a maximum $W_M$ such that:

$$W_m = W_2 - 60\text{mm and } W_M = W_2 + 60\text{mm}.$$

The width $W_1$ is therefore:

$$W_2 - 60\text{mm} \leq W_1 \leq W_2 + 60\text{mm}$$

Since the plies in ply structure 22 are of equal width and are superposed symmetrically with respect to the median equatorial plane X—X, the distance L between the lateral edges of the two ply structures, on either side of the plane, is determined by $\frac{1}{2}(W_1 - W_2)$. From the above equations, the maximum distance is therefore 30mm. FIG. 10 shows the ply structure 22 of width $W_1$, which is of the maximum width $W_M$ and, therefore extends 30mm beyond each lateral edge of the ply structure 21. FIG. 11 shows the ply structure 22 of width $W_1$ which is the minimum width $W_m$ and therefore the lateral edges of plies 25 and 26 are 30 mm. inward of the lateral edges of ply structure 21. The distance L is the amount of overlapping relationship between the first and second ply structures. It is determined by a measurement between the remote lateral edge of the widest ply of the first ply structure and the remote lateral edge of the second ply structure when measured on the same side of the median equatorial plane. Stated in another manner, the remote lateral edges of the second ply structure is within an interval 60mm wide, the center of which interval is determined by the corresponding remote lateral edge of the ply of the first ply structure which is farthest from the median equatorial plane. According to the general principles of this invention, the width of the non-metallic second ply structure ranges from 30mm more to 30mm less than the width of the widest ply-layer of the metal first ply structure, where this widest ply-layer is symmetrical with respect to the median equatorial plane and the second ply structure.

Where the breaker utilizes lamelliform metallic reinforcing elements, these will generally be in the form of thin flat metal, preferably steel, strips or bands having a thickness between about 0.12 and 0.40mm, preferably on the order of about 0.25mm, and a width between about 1 and 3mm, and the lateral spacing of adjacent strips or bands in any given layer of the ply structure will be between about 0.5 and 1mm. On the other hand, where the breaker utilizes filiform metallic reinforcing elements, these will generally be in the form of round metal, preferably steel, wires or cables having an effective diameter between about 0.25 and 2.5mm, and the lateral spacing of adjacent wires or cables in the ply structure will be between about 0.5 and 1.0 times the said diameter. It is within the contemplation of the present invention that either type of metallic reinforcing elements may be used in both plies of the ply structure 30, or that one ply may include lamelliform elements and the other filiform elements.

Figure 12:
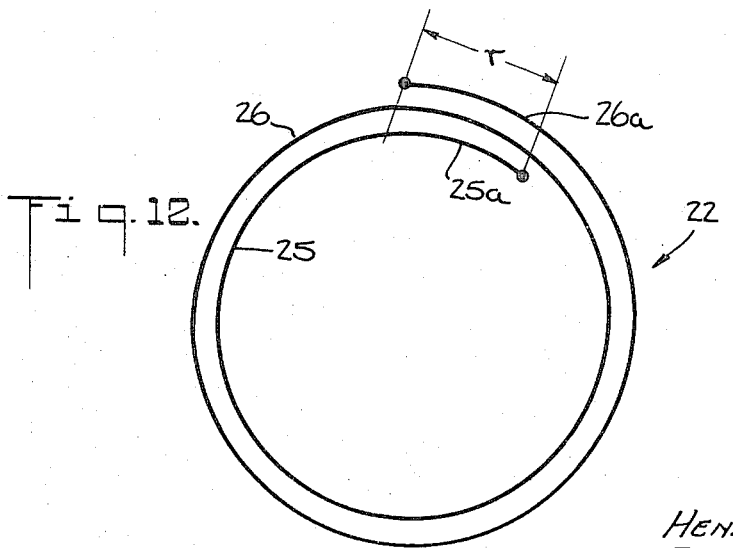
FIG. 12 is a diagrammatic axial view of the plural layer 0° textile ply structure utilized in the breaker according to the present invention.

The ply structure 22 is constituted by a single length of weftless 0° breaker cord fabric, in which all the cords extend substantially parallel to the longitudinal dimension of the fabric, wound in a continuous spiral circumferentially about the crown region of the carcass 12 for at least a plural number of full turns (FIG. 12) equal to the number of layers desired, two in the breaker construction according to the present invention shown in the drawings. Preferably, the length of the cord fabric is wound in a continuous spiral circumferentially of the tire carcass for somewhat more than the requisite number of full turns, i.e. to include a small fraction of an additional turn, so as to dispose the outer terminal end section 26a of the fabric in overlapping relation to the inner terminal end section 25a by an initial amount $r$ equal to between about 10 and 30mm and preferably about 20mm. The plural plies resulting from spiral winding are of equal widths and are disposed symmetrically with respect to the equatorial plane X—X. The reinforcing elements of the plural plies are cords or filaments made of a synthetic or natural textile materials and are oriented parallel to the equatorial plane of the carcass. The synthetic or natural textile material may be cotton, rayon, nylon or a polyester. Preferably a synthetic textile material, such as rayon, nylon or a polyester, is desirable since these materials are heat shrinkable during vulcanization of the tire carcass. The heat-shrinkable textile materials will provide a restraint against the stretching of the underlying metal plies caused by centrifuge forces during high speed service. Shrinking of the textile ply material, although ordinarily an undesirable feature, provides a prestressing of the breaker which counteracts expansion forces during tire service. After vulcanization, the boundary of the overlapping end section 26a has a generally curved shape, as shown in FIG. 13. The value of the overlap diminishes from the edges of the outer ply from, for example, $r=30$mm, to approximately $r'=5$mm at the median equatorial plane X—X.

The number of metal plies comprising ply structure 21 may vary according to the service of the tire. In the present invention, two metal plies are shown. Where the tire is intended for heavy service, as, for example, in large vehicles, off-the-road or farm use, the number of metal plies can be greater than two. The relative arrangement of the metal plies, however, is in accordance with the general principles of the present invention. Thus, where the metal plies are arranged as in FIGS. 2 and 7, the successive plies have widths which decrease when viewed in a direction radially from the carcass to the tread. Where the metal plies correspond to the arrangement of FIGS. 3 and 6, the successive plies have widths which increase when viewed in a direction radially from the carcass to the tread. Similarly, disposing the metal plies as in FIGS. 4 and 9, the successive plies have widths which decrease, while in FIGS. 5 and 8, the successive plies have widths which increase, when either arrangement is viewed in a direction radially from the carcass to the tread.

Pneumatic tires having a radial or substantially radial carcass and a tread reinforcing breaker according to the present invention have improved operating characteristics. Three tire carcasses were vulcanized in a mold 625mm in diameter. A first tire carcass included a breaker comprising only two metal plies, such as the ply-layers used in ply structure 21 of the present invention. After vulcanization, the tire, when inflated, had a diameter of 626mm. A second tire carcass included a breaker comprising only two textile plies, such as the ply-layers used in ply structure 22 of the present invention, in which the reinforcing elements were made of polyester. After vulcanization, the tire, when inflated, had a diameter of 617mm. A third tire carcass included a breaker comprising a first metal two-ply structure and a superposed second non-metal two-ply structure according to the present invention, the reinforcing elements being made of polyester. After vulcanization, the tire, when inflated, had a diameter of 625mm. A comparison of the mold diameter and the inflated diameter indicates the tensile condition of the breaker. In the first tire carcass, the diameter difference of 1mm larger shows the restraining effect of the metal breaker plies. In the second tire, the diameter difference is significant and shows that the textile breaker plies are under tension due to shrinking during vulcanization. In the third tire, there is no diameter difference, showing the desirable advantage of a textile and metal breaker. Since the textile part of the breaker shrinks during vulcanization, this ply structure is under tension.

Further improved qualities have been found from tests on pneumatic tires which differ from one another only in the construction of the breaker. A tire having only a metal two ply breaker, such as the ply layers used in ply structure 21, withstood a speed equivalent to 190 km/h before failure. A tire having a breaker comprising a first metal two-ply structure and a superposed second textile two-ply structure according to the present invention, where the reinforcing elements are made of polyester, withstood an equivalent speed of 265 km/h before failure. A tire having the same breaker construction as the last-named breaker except where the reinforcing elements were made of "nylon" withstood an equivalent speed of 296 km/h before failure.

A breaker comprising only plural metal ply-layers in which the metal reinforcing elements are oriented at a bias to the median equatorial plane of the tire at an approximate angle of 30°, provides a tire having comfortable riding characteristics. Because of this bias angle, the lateral rigidity of the tire is lower, and the cornering and road holding characteristics are correspondingly lower. The addition of plural textile ply-layers in accordance with the present invention, does not affect the comfortable riding characteristics, but considerably improves the cornering and road holding characteristics. It is therefore possible to select a compromise between the transverse rigidity provided by the bias metal ply layers and the longitudinal rigidity provided by the 0° textile ply layers, so as to establish the optimum comfort, road holding, cornering and high speed characteristics for a tire of given dimensions and designed for a given use.

Further, the breaker according to the present invention, permits the tire to be lighter in weight and therefore provide a more comfortable riding tire. The reduction in weight is due to the use of a textile instead of only metal reinforcing breaker elements. In addition the density of the reinforcing elements of the plural metal ply-layers can be reduced because the plural textile ply-layers provide additional tread reinforcement.

It will be understood that the foregoing disclosure of preferred embodiments of the present invention is for purposes of illustration only, and that the various structural and operational features disclosed may be modified and changed in a number of ways none of which involves any departure from the spirit and scope of the invention as defined in the hereto appended claims.

Having thus described the invention, what is claimed and desired to be protected by Letters Patent is:

1. In a pneumatic tire having a carcass, the tread being integral with the carcass a tread surrounding the crown region of such carcass, sidewalls overlying the lateral regions of the carcass from the bead regions of the tire to the marginal regions of the tread, and a tread reinforcing breaker disposed circumferentially about the crown region of the carcass between the latter and the tread, the breaker comprising a first plural-layer ply structure having elongated metallic reinforcing elements and a second plural-layer ply structure having elongated parallel non-metallic reinforcing elements, the second ply structure being arranged in superposed concentric relation to the first ply structure, the metallic reinforcing elements in each layer of the first ply structure being oriented at a respective bias angle of between 16° and 30° to the median equatorial plane of the tire and in crossing relation to the metallic reinforcing elements in each adjacent layer of the first ply structure, the layers of the second ply structure being of equal width and symmetrical to the median equatorial plane and comprising a single length of transversely continuous non-metallic breaker cord fabric of uniform desired width extending circumferentially about the crown region of the carcass in a continuous spiral for at least a plurality of full turns, the non-metallic reinforcing elements in the second ply structure being oriented at an essentially 0° angle to the median equatorial plane, the desired width of the second ply structure being greater than the width of the widest ply layer of the first ply structure, and at least equal to the width of the tread the widest ply layer of the first ply structure being symmetrical with respect to the median equatorial plane and the second ply structure.

2. A pneumatic tire according to claim 1 wherein the first ply structure comprises at least two layers each of which is continuous transversely of the tire from one edge region of the tread to the other, and the radially inwardmost layer of the second ply structure is directly adjacent to the radially outwardmost layer of the first ply structure.

3. A pneumatic tire according to claim 2 wherein the second ply structure is disposed in circumferential surrounding relationship to at least a part of the first ply structure.

4. A pneumatic tire according to claim 2 wherein the second ply structure is disposed in circumferential surrounding relationship to the entire width of the first ply structure.

5. A pneumatic tire according to claim 2 wherein at least one layer of the first ply structure comprises metallic reinforcing elements which are lamelliform and at least one layer which are filliform.

6. A pneumatic tire according to claim 1 wherein the respective bias angles of each ply of the first ply structure are equal numerically but opposite in sense relative to the median equatorial plane of the tire.

7. A pneumatic tire according to claim 1 wherein the respective bias angles of each ply of the first ply structure are unequal numerically but opposite in sense relative to the median equatorial plane of the tire.

8. A pneumatic tire according to claim 1 wherein the reinforcing elements of the second ply structure is made from a heat shrinking material.

9. A pneumatic tire according to claim 1 wherein the non-metallic reinforcing elements in the second ply structure are made of material selected from the group consisting of glass fiber, nylon, rayon, polyester.

10. A pneumatic tire according to claim 9 wherein the second ply structure extends about the crown region of the carcass for a small amount more than two full turns sufficient to create an overlap of between 10mm and 30mm of the outermost terminal section of the breaker cord fabric relative to the innermost terminal section thereof.

11. A pneumatic tire according to claim 1 wherein the first ply structure is symmetrical with respect to the median equatorial plane.

12. A pneumatic tire according to claim 11 wherein all of the ply-layers of the first ply structure are of equal width.

13. A pneumatic tire according to claim 11 wherein the ply-layers of the first ply structure are of unequal widths.

14. A pneumatic tire according to claim 11 wherein the widest ply-layer of the first ply structure is the radially outwardmost ply-layer.

15. A pneumatic tire according to claim 11 wherein the widest ply-layer of the first ply structure is the radially inwardmost ply-layer.

16. A pneumatic tire according to claim 13 wherein the widest ply-layer of the first ply structure is the radially outwardmost ply-layer.

17. A pneumatic tire according to claim 13 wherein the widest ply-layer of the first ply structure is the radially inwardmost ply-layer.

18. A pneumatic tire according to claim 1 wherein the first ply structure is asymmetrical with respect to the median equatorial plane.

19. A pneumatic tire according to claim 18 wherein the widest ply-layer of the first ply structure is the radially outwardmost ply-layer.

20. A pneumatic tire according to claim 18 wherein the widest ply-layer of the first ply structure is the radially inwardmost ply-layer.

21. A pneumatic tire according to claim 1 wherein the widest ply-layer of the first ply structure is the radially outwardmost ply-layer.

22. A pneumatic tire according to claim 1 wherein the widest ply-layer of the first ply structure is the radially inwardmost ply-layer.

23. A pneumatic tire according to claim 18 wherein the first ply structure comprises at least two ply-layers, the lateral edge of one ply-layer being in substantially coinciding overlying relation to the lateral edge of the other ply-layer.

24. In a pneumatic tire having a carcass, a tread surrounding the crown region of such carcass, sidewalls overlying the lateral regions of the carcass from the bead regions of the tire to the marginal regions of the tread, and a tread reinforcing breaker disposed circumferentially about the crown region of the carcass between the latter and the tread, the breaker comprising a first plural-layer ply structure having elongated metallic reinforcing elements and a second plural-layer ply structure having elongated parallel non-metallic reinforcing elements, the second ply structure being arranged in superposed concentric relation to the first ply structure, the metallic reinforcing elements in each layer of the first ply structure being oriented at a respective bias angle between 16° and 30° to the median equatorial plane of the tire and in crossing relation to the metallic reinforcing element in each adjacent layer of the first ply structure, the layers of the second ply structure being of equal widths and symmetrical to the median equatorial plane and comprising a single length of transversely continuous non-metallic breaker cord fabric of uniform desired width extending circumferentially about the crown region of the carcass in a continuous spiral for at least a plurality of full turns, the nonmetallic reinforcing elements in the second ply structure being oriented at an essentially 0° angle to the plane, the second ply structure having a desired width greater than the width of the widest ply-layer of the first ply structure and a desired width at least equal to the width of the crown region.

25. A pneumatic tire according to claim 24 wherein the difference in width between the second ply structure and the widest ply layer of the first ply structure is not more than 60mm.

26. A pneumatic tire according to claim 24 wherein the widest ply-layer of the first ply structure is symmetrical with respect to the median equatorial plane.

* * * * *

UNITED STATES PATENT AND TRADEMARK OFFICE
CERTIFICATE OF CORRECTION

PATENT NO. : 3,786,851
DATED : January 22, 1974
INVENTOR(S) : Henri Mirtain et al.

It is certified that error appears in the above-identified patent and that said Letters Patent are hereby corrected as shown below:

Col. 6, claim 1, lines 1 to 3, should read --In a pneumatic tire having a carcass, a tread surrounding the crown region of such carcass, the tread being integral with the carcass, sidewalls overlying the--

Col. 7, claim 1, lines 25, remove ",".

Col. 7, claim 1, line 26, insert after "tread", --,--.

Signed and Sealed this ninth Day of September 1975

[SEAL]

Attest:

RUTH C. MASON
Attesting Officer

C. MARSHALL DANN
Commissioner of Patents and Trademarks